(12) United States Patent
Zaarur et al.

(10) Patent No.: US 8,788,777 B2
(45) Date of Patent: Jul. 22, 2014

(54) MEMORY ON-DEMAND, MANAGING POWER IN MEMORY

(75) Inventors: Ofer Zaarur, Brookline, MA (US); Jason Chagas, Hubbardston, MA (US)

(73) Assignee: Marvell World Trade Ltd., St. Michael (BB)

( * ) Notice: Subject to any disclaimer, the term of this patent is extended or adjusted under 35 U.S.C. 154(b) by 250 days.

(21) Appl. No.: 13/464,850

(22) Filed: May 4, 2012

(65) Prior Publication Data
US 2012/0284475 A1 Nov. 8, 2012

Related U.S. Application Data

(60) Provisional application No. 61/483,599, filed on May 6, 2011, provisional application No. 61/492,706, filed on Jun. 2, 2011.

(51) Int. Cl.
*G06F 12/02* (2006.01)
*G06F 1/32* (2006.01)

(52) U.S. Cl.
CPC .................................... *G06F 1/3275* (2013.01)
USPC ......................................................... 711/165

(58) Field of Classification Search
CPC ... G06F 1/3275; G06F 1/3287; G06F 3/0625; G06F 11/1441; G06F 12/0811
See application file for complete search history.

(56) References Cited

U.S. PATENT DOCUMENTS

| | | | |
|---|---|---|---|
| 5,687,382 A | 11/1997 | Kojima et al. | |
| 7,779,280 B2 * | 8/2010 | Shuster | 713/320 |
| 8,572,416 B2 * | 10/2013 | Sutardja et al. | 713/320 |
| 8,589,650 B2 * | 11/2013 | Yokoya et al. | 711/165 |
| 8,607,084 B2 * | 12/2013 | Huang et al. | 713/320 |
| 2007/0005998 A1 | 1/2007 | Jain et al. | |
| 2009/0106573 A1 * | 4/2009 | Lin | 713/324 |
| 2011/0231595 A1 * | 9/2011 | Wakrat et al. | 711/103 |
| 2011/0307720 A1 * | 12/2011 | Huang et al. | 713/320 |
| 2013/0166866 A1 * | 6/2013 | Yerushalmi et al. | 711/162 |

FOREIGN PATENT DOCUMENTS

WO WO2011046788 A2 4/2011

OTHER PUBLICATIONS

Filip, Liviu, Authorized Officer, European Patent Office, in International Search Report and Written Opinion of the International Search Authority, dated Aug. 10, 2010, in Application No. PCT/US2012/036665, 12 pages.

* cited by examiner

Primary Examiner — Hiep Nguyen

(57) ABSTRACT

A memory controller for managing data and power in a memory is described. In some implementations, the memory controller is configured to identify a first area of the memory to be operated at a first power level, identify a second area of the memory to be operated at a second power level, transfer data in a region in the second area to a region in the first area, maintain a mapping of an address associated with the region in the second area to an address associated with the region in the first area, operate the first area at the first power level, and operate the second area at the second power level.

24 Claims, 13 Drawing Sheets

MEMORY ON-DEMAND, MANAGING POWER IN MEMORY

CROSS-REFERENCE TO RELATED APPLICATIONS

This disclosure claims the benefit of the priority of U.S. Provisional Application Ser. No. 61/483,599, titled "JIT RAM," filed on May 6, 2011, and U.S. Provisional Application Ser. No. 61/492,706, titled "JIT RAM," filed on Jun. 2, 2011, the disclosures of which are incorporated herein by reference in their entirety.

TECHNICAL FIELD

The present disclosure relates to management of memory.

BACKGROUND

Modern devices, such as smartphones, tablet computers, and desktop computers, are being designed with advanced computing capabilities. The processors embedded in these devices are thus being designed to process increasingly higher numbers of instructions per second. As the number of instructions per second increases, system usage also increases, which leads to an increase in memory usage. The memory in these devices thus becomes larger to accommodate the increase in memory usage. The larger memory can increase the overall power consumed by the device.

Some system components in a device, such as memory, may operate in various power consumption modes, such as active, standby, or off. In active mode, the memory is in a high power consumption mode. In standby mode, the memory is in a reduced power consumption mode. In off mode, the memory is powered off. Typically, the power consumption mode of the memory is globally controlled by the operation mode of the device as a whole. Thus, the operation mode of the device dictates the power consumption mode of the memory. The memory is placed in standby mode or off mode when the entire device is set to standby mode, hibernation mode, or off mode. Furthermore, memory typically operates in a single power consumption mode at a time, e.g., in either active mode, standby mode, or off mode. Inability to individually control portions of memory can thus degrade the performance of a device in terms of overall power consumed by the device.

SUMMARY

The present disclosure describes systems and techniques relating to management of memory. According to an aspect of the described systems and techniques, a system includes a memory controller configured to identify a first area of a memory to be operated at a first power level and identify a second area of the memory to be operated at a second power level, where the first power level is higher than the second power level. The memory controller is configured to transfer data in a region in the second area to a region in the first area. The region in the second area is a region that is frequently accessed by a processing device. The memory controller is configured to maintain a mapping of an address associated with the region in the second area to an address associated with the region in the first area. The memory controller is configured to operate the first area at the first power level and operate the second area at the second power level.

The described systems and techniques can be implemented in electronic circuitry, computer hardware, firmware, software, or in combinations of them, such as the structural means disclosed in this specification and structural equivalents thereof. Apparatus implementations can be realized from a disclosed system or method. Similarly, method implementations can be realized from a disclosed system or apparatus, and system implementations can be realized from a disclosed method or apparatus.

Details of one or more implementations are set forth in the accompanying drawings and the description below. Other features, objects, and advantages may be apparent from the description and drawings, and from the claims.

DESCRIPTION OF DRAWINGS

Like reference symbols in the various drawings indicate like elements.

DETAILED DESCRIPTION

Various implementations of the present disclosure are discussed below in the context of a volatile memory managed by a volatile memory controller. The systems and techniques described herein are generally applicable to any memory device, such as a non-volatile memory, in which it is desirable to manage data and power in the memory device. For example, the systems and techniques described herein may be applicable to manage data and power of in an array of hard disk drives. While specific implementations of memory and memory controllers are illustrated and described, many other memory and memory controller implementations may exist that include components different than those illustrated and described below.

Figure 1:
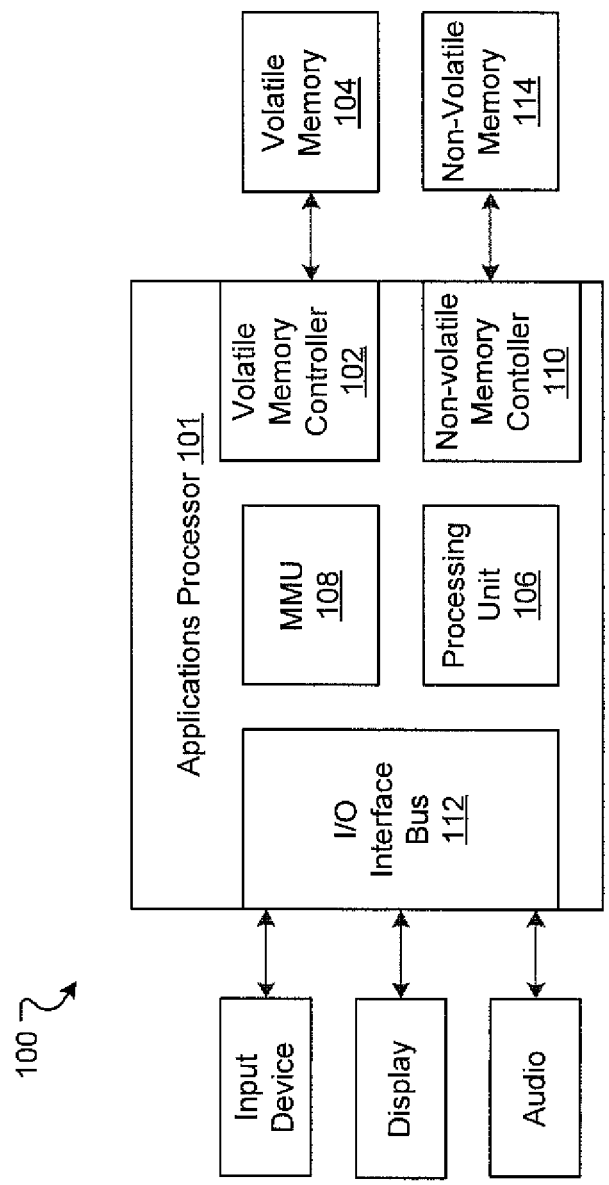
FIG. 1 illustrates a block diagram of an example of a device that includes an applications processor in which a memory controller may be utilized to manage data and power in a memory.

FIG. 1 illustrates a block diagram of an example of a device 100 that includes an applications processor 101 in which a memory controller may be utilized to manage data and power in a memory. For example, a volatile memory controller 102 may be utilized to manage data and power in a volatile memory 104. The volatile memory 104 may include any memory device that requires power to maintain stored information, such as random-access memory (RAM), including dynamic random-access memory (DRAM), static random-access memory (SRAM), double data rate random-access memory (DDR RAM), and other similar devices. A non-volatile memory controller 110 may be utilized to manage data and power in a non-volatile memory 114. The non-volatile memory 114 may include any data storage device that does not require power to retain stored information, such as flash memory, hard disk, floppy disk, magnetic tape, and other persistent storage devices.

The applications processor 101 may include a processing unit 106, a memory management unit (MMU) 108, and an input/output interface bus 112. The processing unit 106 may be configured to access data stored in the volatile memory 104 through the MMU 108 and/or the volatile memory controller 102. The processor 101 may communicate with the non-volatile memory 114 through the non-volatile memory controller 110.

Figure 2:
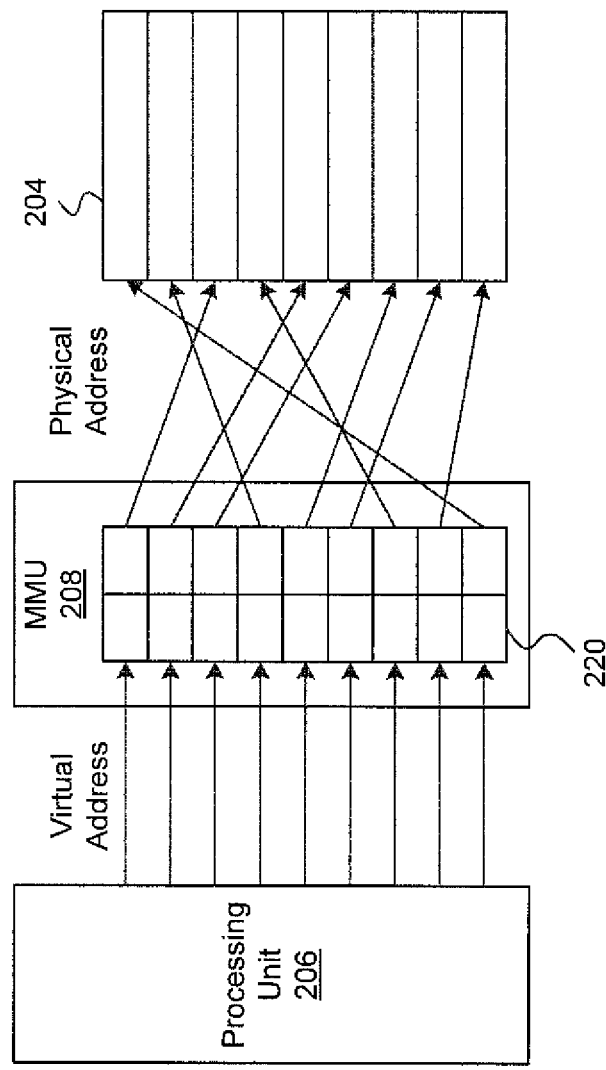
FIG. 2 illustrates a block diagram of an example of the operation of a memory management unit to handle requests from a processing unit to access a memory.

FIG. 2 illustrates a block diagram of an example of the operation of a MMU 208 to handle requests from a processing unit 206 to access a memory 204. The memory 204 may be, for example, the volatile memory 104 or the non-volatile memory 114 of FIG. 1. The MMU 208 is configured to manage data in the memory 204 and handle requests from the processing unit 206 to access the memory 204. The MMU 208 separates virtual memory addresses used by the processing unit 206 from actual physical addresses of the memory 204. With virtual memory, a contiguous range of virtual addresses can be mapped to non-contiguous physical addresses in the memory 204. Each time the processing unit 206 accesses data stored in the memory 204, the MMU 208 translates the virtual address to the physical address.

The MMU 208 may include a data structure 220, such as a translation lookaside buffer (TLB), that stores a translation of virtual addresses to physical addresses. The addresses may be bank level addresses, block level addresses, page level addresses, segment level addresses, region level addresses, or any other suitable level of addressing. The data structure 220 may be implemented as content-addressable memory (CAM). The MMU 208 may search the data structure 220 for the virtual address received from the processing unit 206 to identify the physical address of the memory 204 that stores the data requested by the processing unit 206.

Referring again to FIG. 1, when the device 100 is placed in standby mode or hibernation mode, data in the volatile memory 104 may be preserved so that the processing unit 106 can resume to an active mode and continue operation from the previous state. To preserve the data, the data may be stored in the volatile memory 104 or transferred from the volatile memory 104 to the non-volatile memory 114. The data may be stored in the volatile memory 104 by operating the volatile memory at a reduced power level that is sufficient to maintain the data in the volatile memory 104. Storing the data in the volatile memory 104 while the device 100 is in standby mode may enable the processing unit 106 to quickly resume to an active mode. Transferring the data from the volatile memory 104 to the non-volatile memory 114 may allow the volatile memory 104 to be turned off while the device 100 is in standby mode or hibernation mode to further reduce the power consumed by the device 100. Although storing the data in the non-volatile memory 114 may save more power than storing the data in the volatile memory 104, the power savings may be at the cost of slower resumption to active mode. When the data is stored in the non-volatile memory 114, the processing unit 106 may need to wait for the data to be transferred from the non-volatile memory 114 back to the volatile memory 104 before continuing operation from the previous state.

The volatile memory controller 102 may be used to improve the performance of the device 100 in terms of overall power consumed by the device 100 with minimal impact on the processing speed of the device 100. The volatile memory controller 102 may be used to reduce the power consumed by the volatile memory 104 when the device 100 is operating in standby mode or active mode. The volatile memory controller 102 may reduce the power consumed by the volatile memory 104 by configuring certain segments of the volatile memory 104 to operate at reduced power levels.

The volatile memory controller 102 may configure certain segments of the volatile memory 104 to operate at certain power levels by, for example, transmitting a command to the volatile memory 104. The command specifies a segment of the volatile memory 104 and a power consumption mode of the segment. Examples of power consumption modes of a segment include active mode, standby mode, and off mode. In active mode, the segment is operating at an active or high power level at which the segment is readily available for access, e.g., data can be read from the segment and written to the segment. In standby mode, the segment is operating at a reduced power level that is sufficient to maintain the data in the volatile memory 104. In off mode, the segment is powered off. Other memory implementations may include additional or different power consumption modes.

Figure 3:
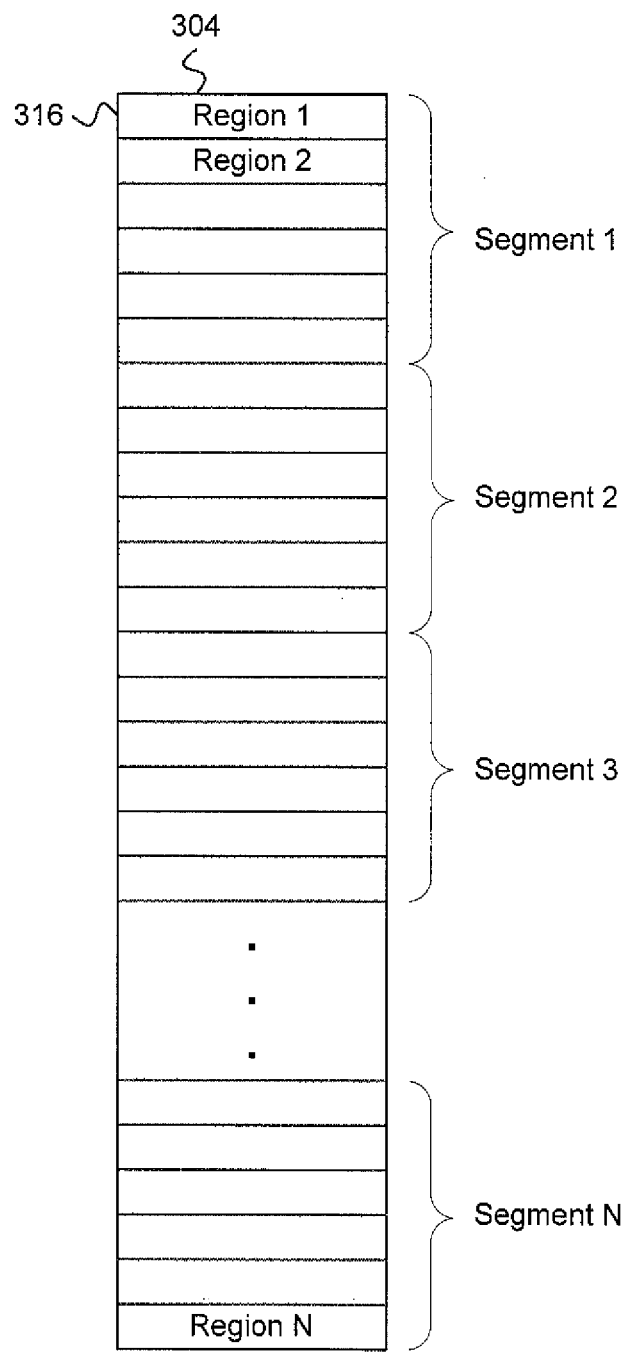
FIG. 3 illustrates an example of a memory having multiple regions and segments.

FIG. 3 illustrates an example of a memory 304 having multiple segments and regions. The memory 304 may be, for example, a volatile memory or a non-volatile memory. The memory 304 may include one or more memory devices, chips, or modules.

The memory 304 can include multiple segments. Each segment of the memory 304 can be individually controlled to operate at different power levels. In some implementations, a segment can be a separate memory chip. In some implementations, a segment can be the size of a module, a bank, a block, a page, or any other suitable size. A segment may be a contiguous range of physical memory addresses.

Each segment can include multiple regions 316. Each region 316 can be individually addressed and accessed. For example, a processing unit can issue commands to read from and write to a region 316 of the memory 304. A region 316 may be a contiguous range of physical memory addresses. A region 316 can be divided into individual bits or larger aggregate data units such as bytes.

Figure 4:
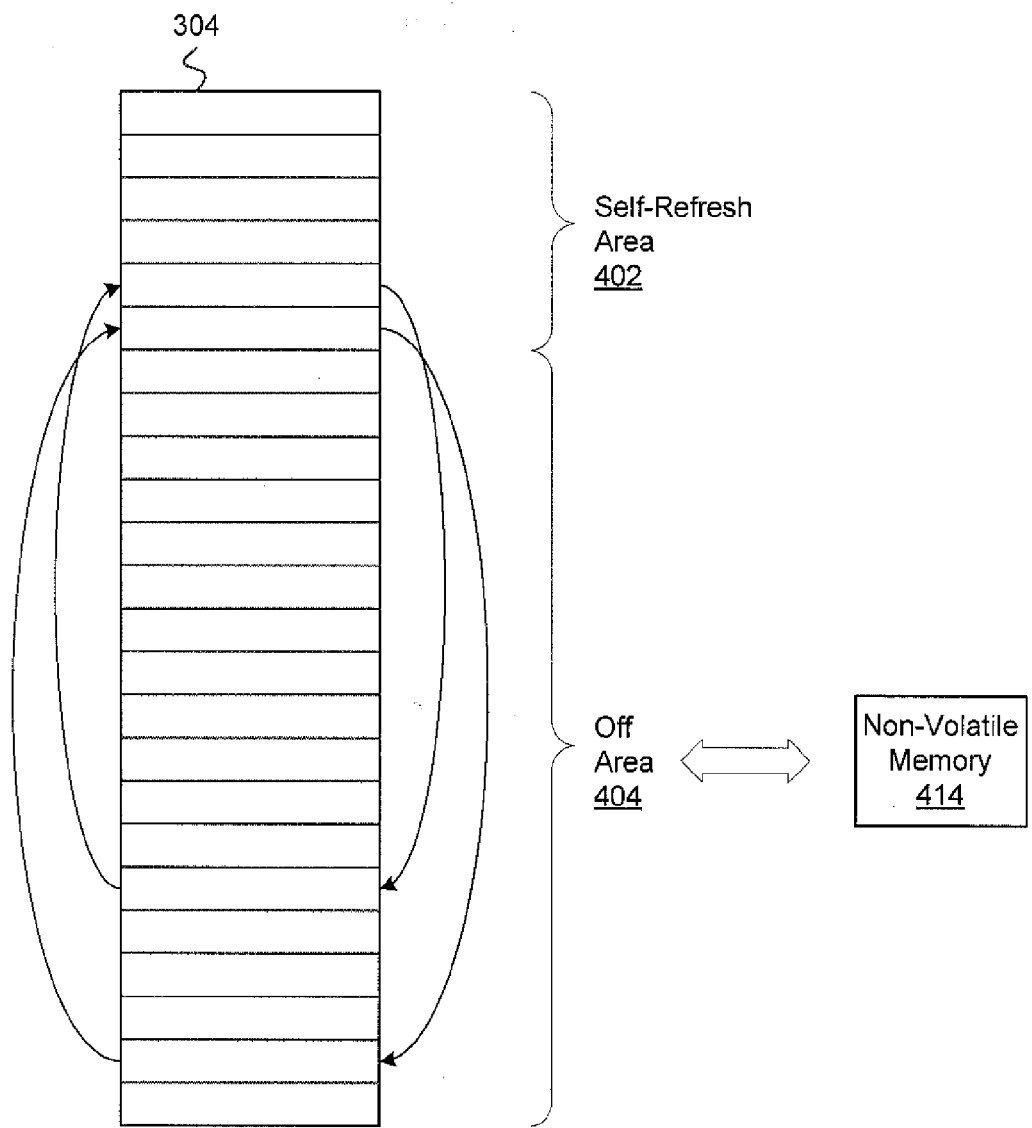
FIG. 4 illustrates an example of the operation of a memory while a device is operating in standby mode.

FIG. 4 illustrates an example of the operation of the memory 304 while a device is operating in standby mode. To reduce the power consumed by the memory 304, a memory controller may aggregate the data that are necessary for a processing unit to quickly resume operation into a self-refresh area 402 of the memory 304. The memory controller may aggregate data by, for example, transferring the data into the self-refresh area 402 or swapping data between the self-refresh area 402 and the off area 404. The self-refresh area 402 may include one or more segments of the memory 304. In implementations where the memory 304 is a volatile memory, the remaining data in the off area 404 may be transferred to a non-volatile memory 414. The self-refresh area 402 of the memory 304 is operated at a reduced power level, e.g., a power level that is sufficient to maintain the data stored in the self-refresh area 402 of the memory 304. The remaining area 404 of the memory 304, which may include one or more segments, is powered off.

When the device resumes to active mode, the power supplied to the self-refresh area 402 of the memory 304 is restored to an active power level, and the processing unit can continue operation from the previous state using the data stored in the self-refresh area 402 of the memory 304. When the memory controller receives a request to access data that has been transferred to the non-volatile memory 414, the segment of the memory 304 in which the data was transferred from may be restored to an active power level, and the data may be transferred from the non-volatile memory 414 back to its original location in the memory 304. In some implementations, the data may alternatively be transferred from the non-volatile memory 414 to the self-refresh area 402 of the memory 304.

Figure 5:
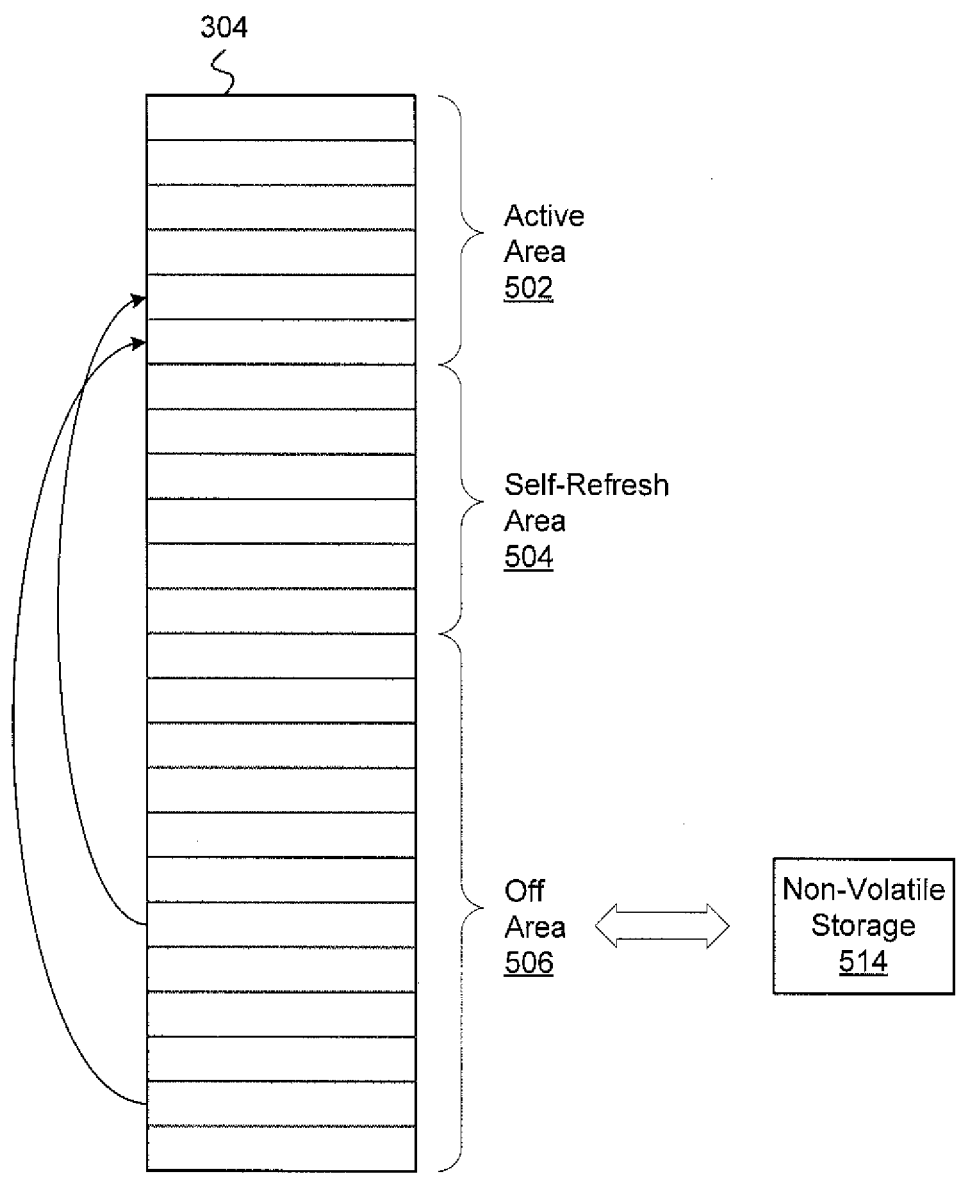
FIG. 5 illustrates an example of the operation of a memory while a device is operating in active mode.

FIG. 5 illustrates an example of the operation of the memory 304 while the device is operating in active mode. To reduce the power consumed by the memory 304, the memory controller may aggregate the data that are frequently accessed by the processing unit into an active area 502 of the memory 304. The active area 502 may include one or more segments of the memory 304. The active area 502 is operated at an active power level so that the processing unit 106 can access the data stored in the active area 502 with minimal latency.

In some implementations, the memory controller may maintain a self-refresh area 504. The self-refresh area 504 may include one or more segments of the memory 304. The self-refresh area 504 is operated at a reduced power level. In some implementations, the self-refresh area 504 may store data that the processing unit may need to access at regular intervals, but less frequently than the data in the active area 502. In some implementations, the self-refresh area 504 may be a reserved area that can be operated at an active power level when an application requires more memory or when a new application starts up.

The remaining data that are rarely accessed by the processing unit is transferred to the non-volatile memory 514, and the remaining area 506, which can include one or more segments, is powered off. When the memory controller receives a request to access data that has been transferred to the non-volatile memory 514, the segment of the memory 304 in which the data was transferred from may be restored to an active power level, and the data may be transferred from the non-volatile memory 514 back to its original location in the memory 304. In some implementations, the data may alternatively be transferred from the non-volatile memory 514 to the active area 502 or the self-refresh area 504 of the memory 304.

Figure 6:
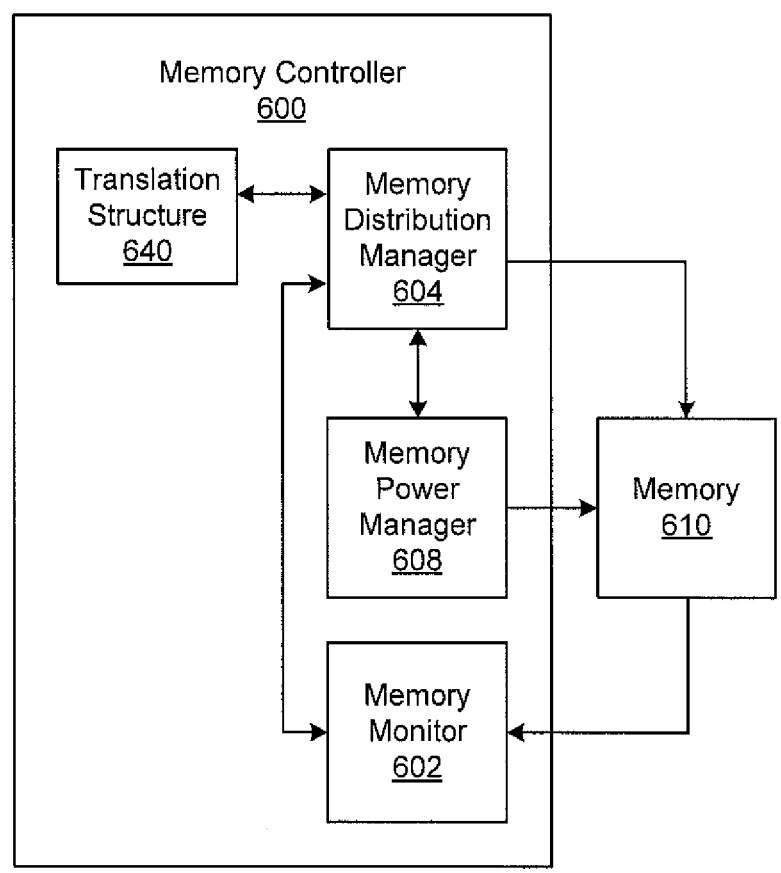
FIG. 6 illustrates a block diagram of an example of a memory controller.

FIG. 6 illustrates a block diagram of an example of a memory controller 600. The memory controller 600 may be configured to manage data and power in a memory 610 and handle requests from a processing unit to access the memory 610. In some implementations, the memory controller 600 may manage data and power in the memory 610 based on user requirements or user-selected configurations. For example, the memory controller 600 may configure some segments of the memory 610 to operate in off mode based on a user-selected configuration to use a power saving mode when the device reaches 30% battery power. In some implementations, the memory controller 600 may manage data and power in the memory 610 based on the amount of power available to the device. For example, the memory controller 600 may configure all segments of the memory 310 to operate at an active power level when the device is connected to a power supply and configure some segments of the memory 610 to operate at reduced power level or in off mode when the device is operating on battery power. The memory controller 600 may include a memory monitor 602, a memory distribution manager 604, a translation structure 640, and a memory power manager 608.

The memory monitor 602 monitors accesses to the memory 610 and collects information, e.g., statistics, about accesses to the memory 610. To prepare for operation of the memory 610 in standby mode, the memory monitor 602 may collect information to identify regions or segments of the memory 610 that are frequently accessed and may be necessary for the processing unit to quickly resume operation. For operation of the memory 610 in active mode, the memory monitor 602 may collect information to identify regions or segments of the memory 610 that are frequently accessed. In some implementations, the memory monitor 602 may collect information to identify regions or segments of the memory 610 that are less frequently but regularly accessed. The memory monitor 602 may communicate the information about the accesses to the memory distribution manager 604. In some implementations, the memory monitor 602 may communicate the information to the memory distribution manager 604 at predefined time intervals. In some implementations, the memory monitor 602 may communicate the information to the memory distribution manager 604 in response to an input indicating that some segments of the memory 610 are to be operated at a reduced power level.

The memory monitor 602 monitors accesses to a region or a segment of the memory 610 by, for example, counting the number of accesses to the region or the segment during a predefined time interval, e.g., one second. The memory monitor 602 may identify regions or segments of the memory 610 as being frequently accessed or rarely accessed based on one or more predefined threshold values. The threshold values may be a number of accesses per second to a region or segment, or a percentage of the total number of accesses per second to the memory 602. For example, a region may be identified as frequently access if the number of accesses per second to the region is at or above a threshold value, and a region may be identified as rarely accessed if the number of accesses per second to the region is below the threshold value. As another example, a region may be identified as frequently accessed if the number of accesses per second to the region is at or above a first threshold value. A region may be identified as rarely accessed if the number of accesses per second to the region is at or below a second threshold value. A region may be identified as less frequently but regularly accessed if the number of accesses per second to the region is between the first threshold value and the second threshold value.

In some implementations, the threshold values may be based on device configurations, settings, or usage. For example, the threshold values may be based on the number of regions of the memory 610 or the number of segments of the memory 610. The threshold values may be based on the number of segments that are to be operated at an active power level. For instance, the memory 610 may have ten segments with each segment containing ten regions. One of the ten segments is to be operated at an active power level. The memory monitor 602 may rank the regions by the number of accesses per second. The regions in the top ten rank positions may be identified as frequently accessed and the remaining regions may be identified as rarely accessed. The ten frequently accessed regions may be aggregated to the ten regions in the segment that is to be operated at an active power level.

The memory distribution manager 604 manages distribution of the memory 610 when the memory 610 is operating in a reduced power consumption mode. The memory distribution manager 604 receives the information about the accesses to memory 610 from the memory monitor 602. Based on the information received from the memory monitor 602, the memory distribution manager 604 determines how to redistribute the memory 610 during different power consumption modes. The memory distribution manager 604 may identify the areas of the memory 610 that are to be operated at an active power level, a reduced power level, or off mode based on the number of regions or segments that are frequently accessed and rarely accessed. The memory distribution manager 604 may manage the distribution of the memory 610 accordingly.

For operation of the memory 610 in standby mode, data in regions that are frequently accessed and may be necessary for the processing unit 106 to quickly resume operation may be stored in a self-refresh area of the memory 104. If a frequently accessed region is not already in the self-refresh area, the memory distribution manager 604 may transfer data in the region into a region in the self-refresh area of the memory 104. In implementations where the memory 610 is a volatile memory, the memory distribution manager 604 may transfer data in the regions that are not necessary for quick resumption of operation to a non-volatile memory.

While the memory 610 is operating in active mode, data in regions that are frequently accessed may be stored in an active area of the memory 610. If a frequently accessed region is not already in the active area, the memory distribution manager 604 may transfer data in the region to the active area of the memory 610. The memory distribution manager 604 may transfer data in regions that are less frequently but regularly accessed to a self-refresh area of the memory 610. In implementations where the memory 610 is a volatile memory, the memory distribution manager 604 may transfer data in regions that are rarely accessed to a non-volatile memory.

To manage data and power in the memory 610, the memory controller 600 adds another stage of address translation to the handling of requests from a processing unit. The memory distribution manager 604 maintains a mapping of a physical address used by a MMU to an actual physical location of data in the memory 610. The addresses may be bank level addresses, block level addresses, page level addresses, segment level addresses, region level addresses, or any other suitable level of addressing. The memory distribution manager 604 may store the mapping in a data structure 640, such as a translation table. The data structure 640 may be implemented as content-addressable memory (CAM). The memory distribution manager 604 may search the data structure 640 for a physical address used by the MMU to identify an actual physical address of the memory 610 that stores the data requested by the processing unit.

The memory power manager 608 controls the power levels of the areas of the memory 104. In some implementations, the memory power manager 608 may receive from the memory distribution manager 604 start addresses and end addresses of areas of the memory 610 that are to be operated in active mode, standby mode, or off mode. In response to the information received from memory distribution manager 604, the memory power manager 608 configures the areas of the memory 610 to operate in the specified power consumption mode.

Figure 7:
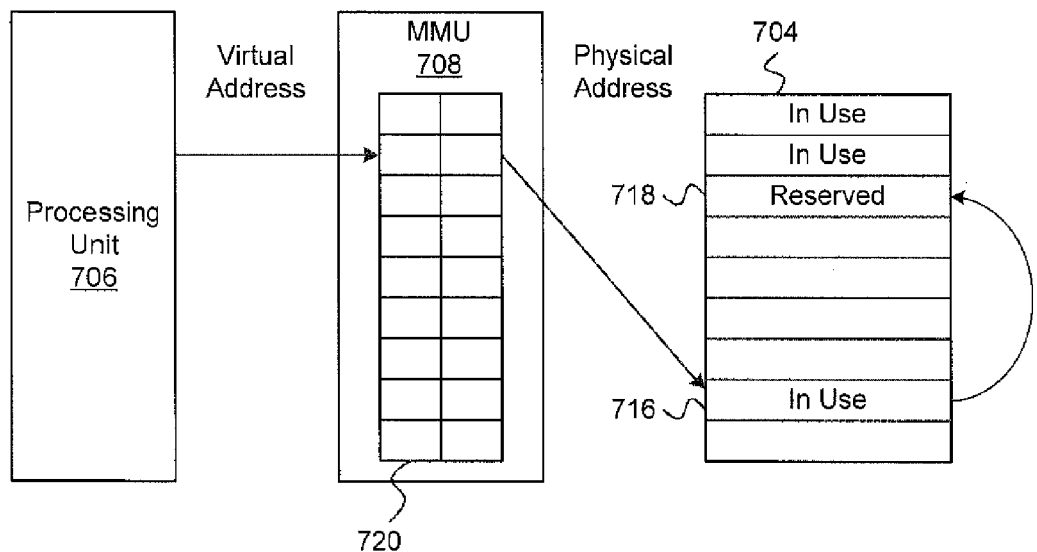
FIGS. 7 and 8 illustrate block diagrams of examples of the operations of transferring data in a region in a memory to a different region in the memory.
Figure 8:
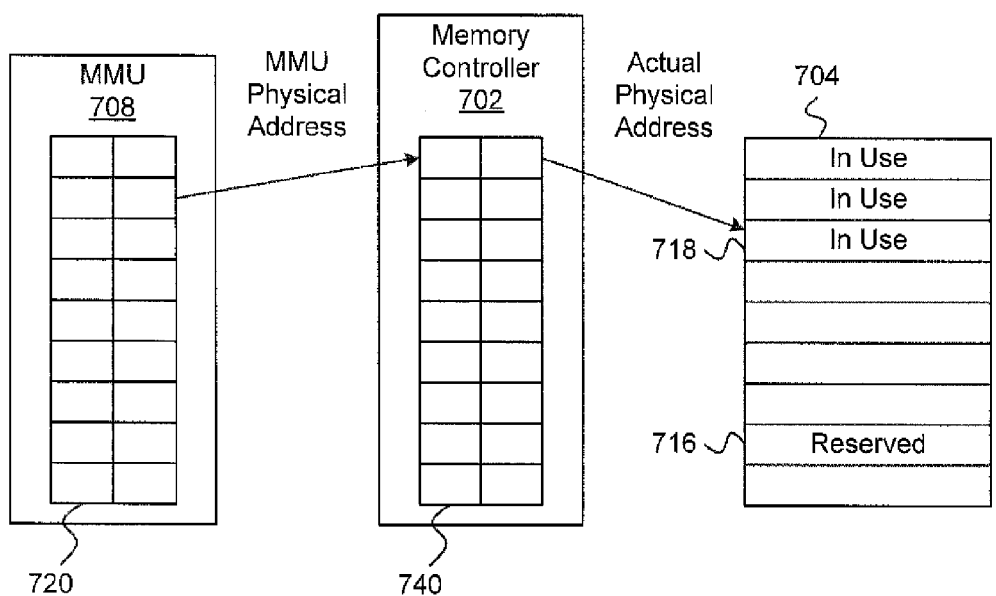

FIGS. 7 and 8 illustrate block diagrams of examples of the operations of transferring data in a region 716 in a memory 704 to a different region 718 in the memory 704. A memory controller 702 may identify the region 716 as a region that is frequently accessed. As shown in FIG. 7, a mapping of a virtual address used by a processing unit 706 to a physical address of the region 716 in the memory 704 is maintained by a MMU 708 in a data structure 720. The memory controller 702 identifies a region 718, e.g., a reserved region, in an area of the memory 704 that is to be operated at an active power level in active mode or a reduced power level in standby mode. The memory controller 702 transfers the data in the region 716 to the region 718. As shown in FIG. 8, the memory controller 702 maintains a mapping of the physical address used by the MMU 708, which corresponds to the physical address of the region 716, to the physical address of the region 718 to which the data was transferred in a data structure 740. After transferring the data, the memory controller 702 may turn off the area of the memory 704 containing the region 716. The region 716 may be marked as a reserved region to be used for a subsequent data transfer. For example, the region 716 may be marked as a reserved region to allow the data to be transferred from the region 718 back to the region 716 when the area containing the region 716 is restored to an active power level.

Figure 9:
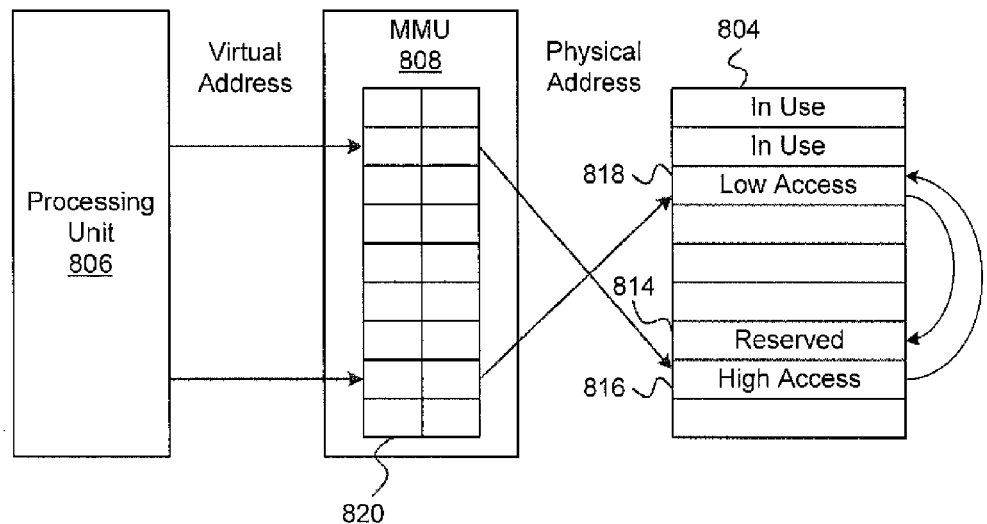
FIGS. 9 and 10 illustrate block diagrams of examples of operations of swapping data in a region in a memory with data in a different region in the memory.
Figure 10:
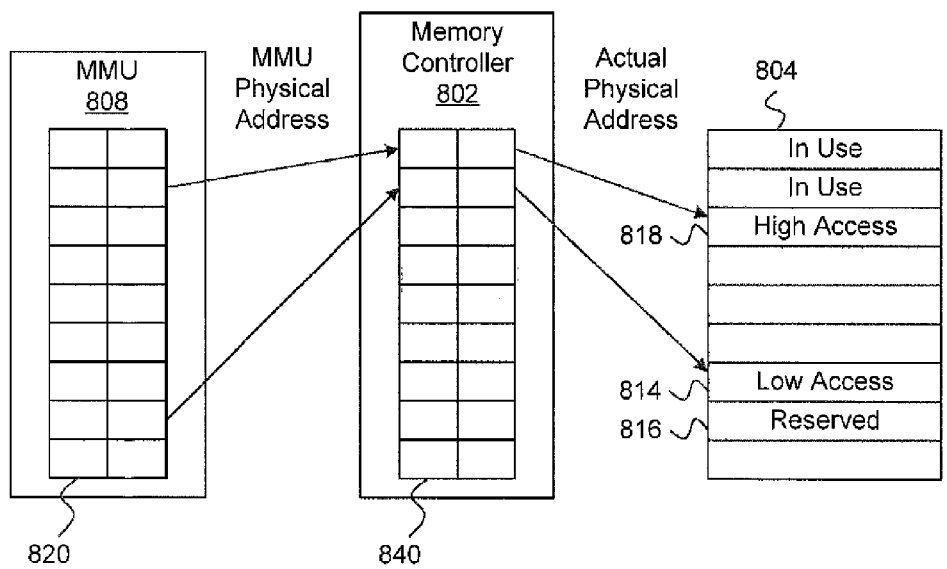

FIGS. 9 and 10 illustrate block diagrams of examples of operations of swapping data in a region 816 in a memory 804 with data in a different region 818 in the memory 804. A memory controller 802 may identify the region 816 as a region that is frequently accessed. The memory controller 802 identifies a region 818 that is accessed less frequently than the region 816 in an area of the memory 804 that is to be operated at an active power level in active mode. As shown in FIG. 9, a mapping of virtual addresses used by a processing unit 806 to physical addresses of the regions 816 and 818 in the memory 804 is maintained by a MMU 808 in a data structure 820. The memory controller 802 identifies a region 814, e.g., a reserved region. The memory controller 802 transfers the data in the rarely accessed region 818 to the reserved region 814. The memory controller 802 then transfers the data in the frequently accessed region 816 to the region 818. As shown in FIG. 10, the memory controller 802 maintains a mapping of the address of the region 816 to the address of the region 818 and a mapping of the address of the region 818 to the address of the region 814. The region 816 may be marked as a reserved region to be used for a subsequent data transfer. After swapping the data, the memory controller 802 may reduce the power level of the area of the memory containing the regions 814 and 816 to a level that is sufficient to maintain the data in the region 814.

Figure 11:
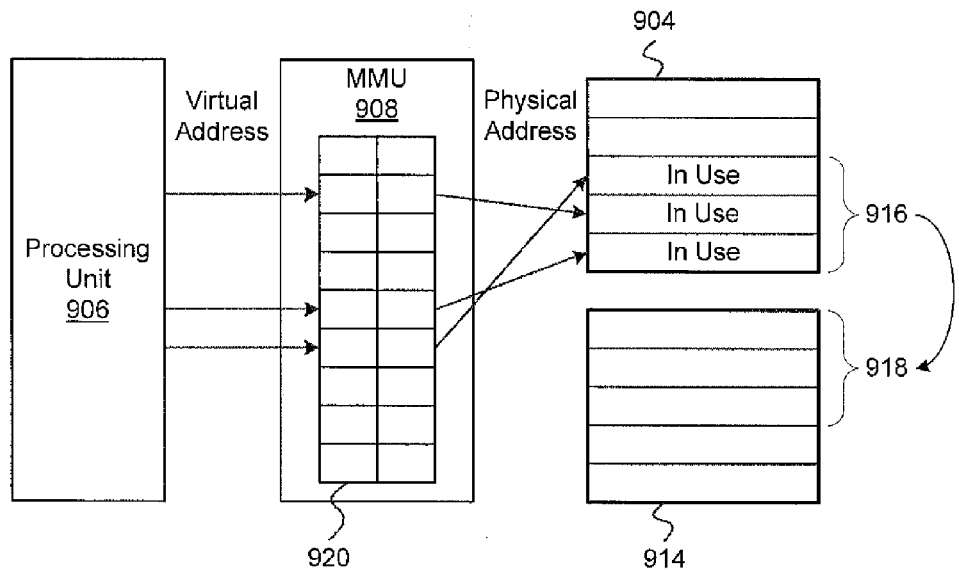
FIGS. 11 and 12 illustrate block diagrams of examples of operations of transferring data in a volatile memory to a non-volatile memory.
Figure 12:
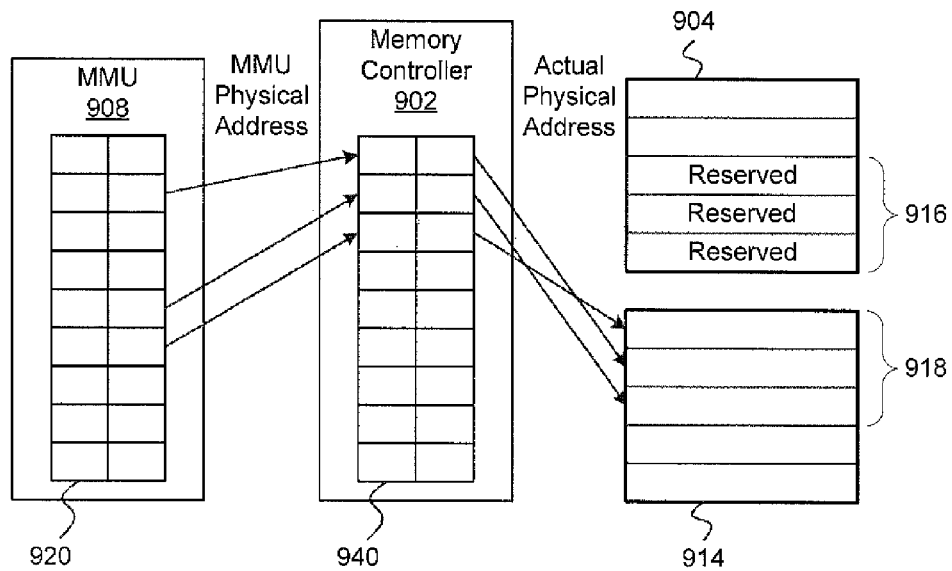

FIGS. 11 and 12 illustrate block diagrams of examples of operations of transferring data in a volatile memory 904 to a non-volatile memory 914. A volatile memory controller 902 may identify an area or a segment that is to be operated in off mode, e.g., an area or a segment that includes regions 916, and transfer the data to the non-volatile memory 914. As shown in FIG. 11, a mapping of virtual addresses used by a processing unit 906 to physical addresses of the regions 916 in the volatile memory 904 is maintained by a MMU 908 in a data structure 920. The volatile memory controller 902 identifies regions 918 in the non-volatile memory 914 to which the data in the regions 916 can be transferred. The volatile memory controller 902 transfers the data in the regions 916 of the volatile memory 904 to the regions 918 of the non-volatile memory 914. As shown in FIG. 12, the volatile memory controller 902 maintains a mapping of the physical addresses used by the MMU 908, which corresponds to the physical addresses of regions 916, to the addresses of the regions 918 in the non-volatile memory 914 to which the data was transferred in a data structure 940. After transferring the data, the volatile memory controller 902 may turn off the area of the volatile memory 904 containing the regions 916. The regions 916 may be marked as reserved to be used for subsequent data transfers. For example, the regions 916 may be marked as reserved to allow the data to be transferred from the non-volatile memory 914 back to the regions 916 in the volatile memory 904 when, for example, the data is requested by the processing unit 906.

In some implementations, a memory controller may maintain a mapping of all physical addresses used by a MMU to the actual physical addresses of a memory. In some implementations, the memory controller may maintain a mapping of physical addresses used by the MMU to actual physical addresses for only the data that was transferred from one region of the memory to another region of the memory or from a volatile memory to a non-volatile memory. In this case, a translation table in the MMU may include a flag or other signal in the entry associated with the physical address used by the MMU to indicate that data was transferred from the physical address used by the MMU to another location. The flag may indicate that a mapping of the physical address used by the MMU to the actual physical address to which the data was transferred is maintained by a translation table in the memory controller.

Figure 13:
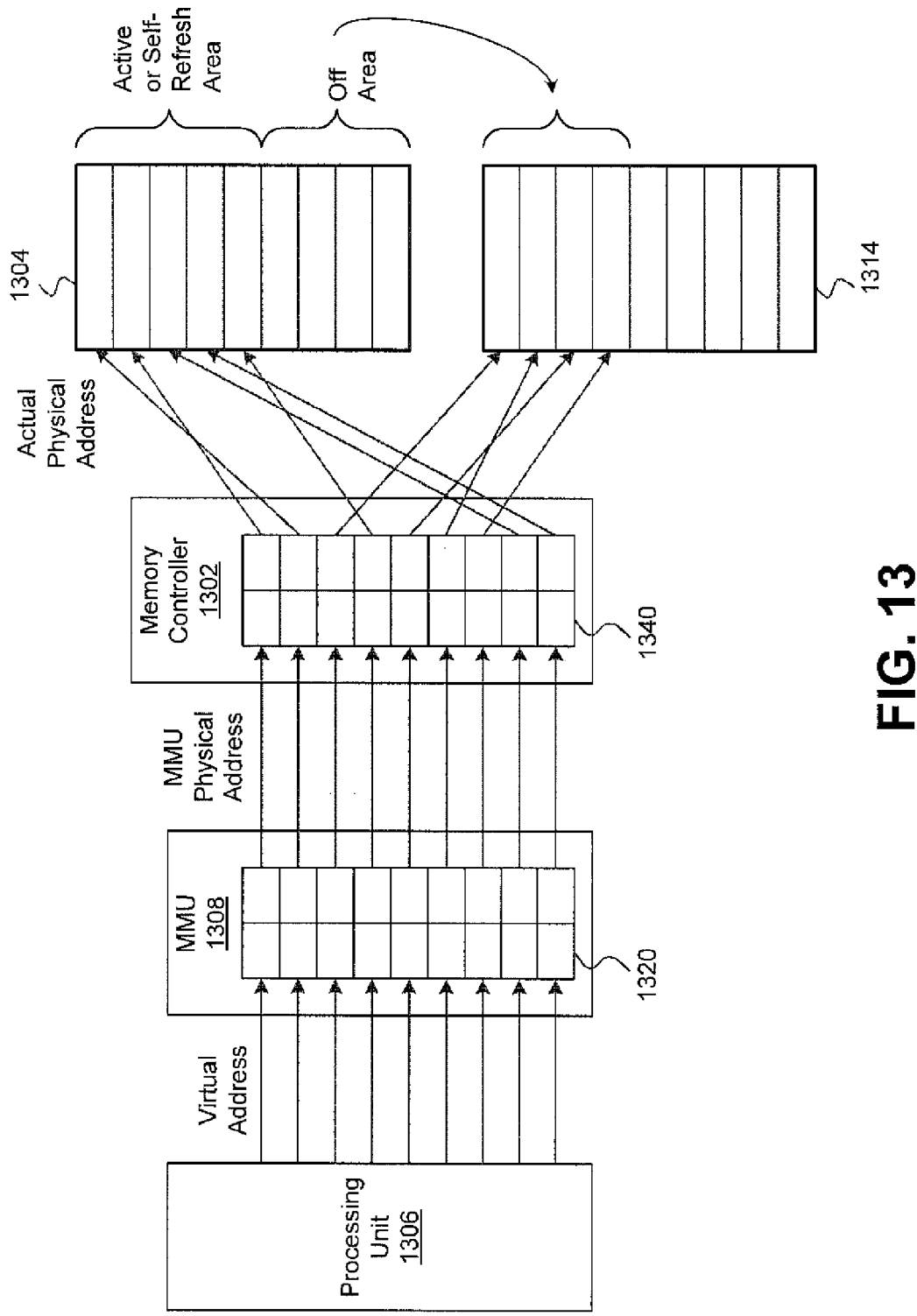
FIG. 13 illustrates a block diagram of an example of the operation of a volatile memory controller to handle requests from a processing unit to access a volatile memory through a memory management unit.

FIG. 13 illustrates a block diagram of an example of the operation of a volatile memory controller 1302 to handle requests from a processing unit 1306 to access a volatile memory 1304 through a MMU 1308. In FIG. 13, the volatile memory controller 1302 maintains a mapping of all physical addresses used by the MMU 1308 to the actual physical addresses of the volatile memory 1304 or a non-volatile memory 1314. The MMU 1308 translates the virtual address used by the processing unit 1306 to the physical address of the region in the volatile memory 1304 that contained the data before the transfer of data occurred. The MMU 1308 maintains a mapping of the virtual address to the physical address in the data structure 1320. The volatile memory controller 1302 receives the physical address maintained by the MMU 1308 and identifies an entry in the translation structure 1340 associated with the physical address maintained by the MMU 1308. Based on the data in the entry, the volatile memory controller 1302 identifies the actual physical address of the volatile memory 1304 or the non-volatile memory 1314 that stores the data.

The volatile memory controller 1302 may transfer data from the non-volatile memory 1314 back to the volatile memory 1304 in response to requests from the processing unit 1306 for data previously transferred to the non-volatile memory 1314. When the processing unit 1306 requests to access data that has been transferred to the non-volatile memory 1314, the volatile memory controller 1302 may transfer data from a region in the non-volatile memory 1314 containing the requested data to a region in the volatile memory 1304. The volatile memory controller 1302 may transfer data from only the region in the non-volatile memory 1314 containing the requested data, as opposed to an area or a segment containing the requested data, to the volatile memory 1304 to minimize potential latency.

In some implementations, the volatile memory controller 1302 may transfer the data from the non-volatile memory 1314 to a region in an active area of the volatile memory 1304. After the volatile memory controller 1302 transfers the data, the volatile memory controller 1302 updates an entry in the data structure 1340 that identifies the address of the non-volatile memory 1314 in which the data was stored with the address of the region in the volatile memory 1304 to which the data was transferred.

In some implementations, the volatile memory controller 1302 may transfer the data from the non-volatile memory 1314 to the region of the volatile memory 1304 in which the data was originally stored. Before transferring the data, the volatile memory controller 1302 may change the power level of an area or a segment of the volatile memory 1304 containing the region from off mode to an active power level. After transferring the data, the volatile memory controller 1302 updates an entry in the data structure 1340 that identifies the address of the non-volatile memory 1314 in which the data was stored. The volatile memory controller 1302 may update the entry by removing the mapping of the physical address used by the MMU 1308 to the address of the non-volatile memory 1314 and replacing the mapping with an indication that the address used by the MMU 1308 is the actual physical address of the volatile memory 1304 in which the data is stored.

Figure 14:
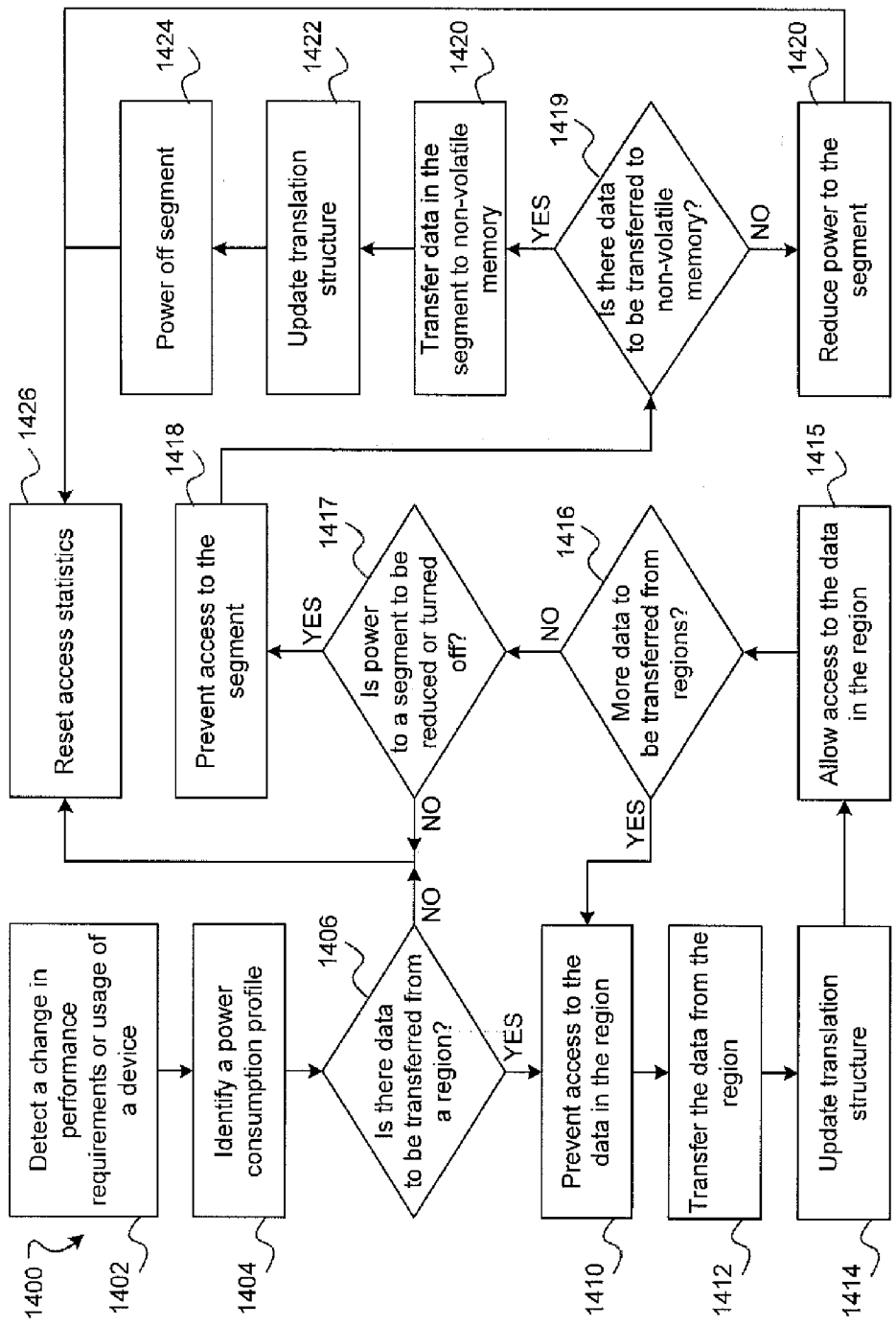
FIG. 14 illustrates a flowchart of examples of operations performed by a volatile memory controller in response to detecting a change in performance requirements or usage of a device.

FIG. 14 illustrates a flowchart of examples of operations 1400 performed by a volatile memory controller in response to detecting a change in performance requirements or usage of a device. At 1402, the volatile memory controller detects a change in performance requirements or usage of a device such that the device can be operated at a reduced power consumption mode. A change in performance requirements or usage of a device can be triggered by, for example, the device being disconnected from a power supply, an application being exited, a user configuring the device to operate in a power saving mode or a standby mode, or the usage of the device being consistent for a certain amount of time.

In response to detecting the change, the volatile memory controller identifies a power consumption profile for volatile memory that corresponds to the new performance requirements or usage of the device at 1404. Identifying a power consumption profile can include determining whether the volatile memory is to be operated in active mode or standby mode. The power consumption profile for active mode can indicate that an area of the volatile memory is to be operated at an active power level and the remaining area of the volatile memory is to be turned off. The power consumption profile for standby mode may indicate that an area of the volatile memory is to be operated at reduced power and the remaining area of the volatile memory is to be turned off. The power consumption profile for an operation mode may also indicate what areas of the volatile memory are to be operated at the specified power levels.

At 1406, the volatile memory controller determines whether any regions of the volatile memory contain data that is to be transferred from an area of the volatile memory to another area of the volatile memory. For example, the volatile memory controller determines whether data in a region of the volatile memory is to be transferred from an area that is to be operated at an active power level to an area that is to be operated at a reduced power level, and whether data in a region of the volatile memory is to be transferred from an area that is to be powered off to an area that is to be operated at an active power level or a reduced power level. The volatile memory controller identifies regions containing data that is to be transferred based on information or statistics relating to accesses of the volatile memory by a processing unit. For example, data in a region that is frequently accessed is to be transferred from an area that is to be operated at a reduced power level to an area that is to be operated at an active power level or from an area that is to be powered off to an area that is to be operated at an active or a reduced power level.

If the volatile memory controller determines that there are no regions that contain data to be transferred, the volatile memory controller resets the collection of statistics about accesses to the volatile memory at 1426. The volatile memory controller may reset the collection by, for example, deleting the collected statistics and restarting the collection of statistics.

If the volatile memory controller determines that there are regions containing data that is to be transferred, the volatile memory controller prevents access to the region by a processing unit at 1410. The volatile memory controller transfers the data in the region at 1412, updates a translation structure to store a mapping of the addresses associated with the region at 1414, and allows access to the region by a processing unit at 1415. At 1416, the volatile memory controller determines whether another region contains data that is to be transferred. If there is a region that contains data that is to be transferred, the volatile memory controller repeats operations 1410 to 1415 until there are no regions that contain data to be transferred.

When there are no regions that contain data to be transferred, the volatile memory controller determines whether power to a segment is to be reduced or turned off at 1417. For example, power to a segment may be reduced when the operating mode of the volatile memory is to be changed from active mode to standby mode. As another example, power to a segment may be turned off when an application is exited, and the segment is being accessed less frequently. As yet another example, power to a segment may be turned off when the usage of the device is consistent for a certain amount of time, and the memory controller identifies a segment as being rarely accessed by a processing unit.

If the volatile memory controller determines that power to the segments do not need to be changed, the volatile memory controller resets the collection of statistics about accesses to the volatile memory at 1426. If the volatile memory controller determines power to a segment is to be reduced or turned off, the volatile memory controller prevents access to the segment of the volatile memory at 1418.

At 1419, the volatile memory controller determines whether there is data to be transferred to a non-volatile memory. The volatile memory determines that there is data to be transferred to non-volatile memory when the segment containing the data is to be powered off. If the volatile memory controller determines that there is no data to be transferred to non-volatile memory, the volatile memory controller reduces power to the segment at 1420 and resets the collection of statistics about accesses to the volatile memory at 1426.

If the volatile memory controller determines that there is data to be transferred to non-volatile memory, the volatile memory controller transfers data in the segment to a non-volatile memory at 1420, and updates the translation structure to store a mapping of the addresses in the volatile memory to the addresses in the non-volatile memory associated with the transferred data in the segment at 1422. At 1424, the volatile memory controller powers off the segment. The volatile memory controller resets the collection of statistics about accesses to the volatile memory at 1426.

Figure 15:
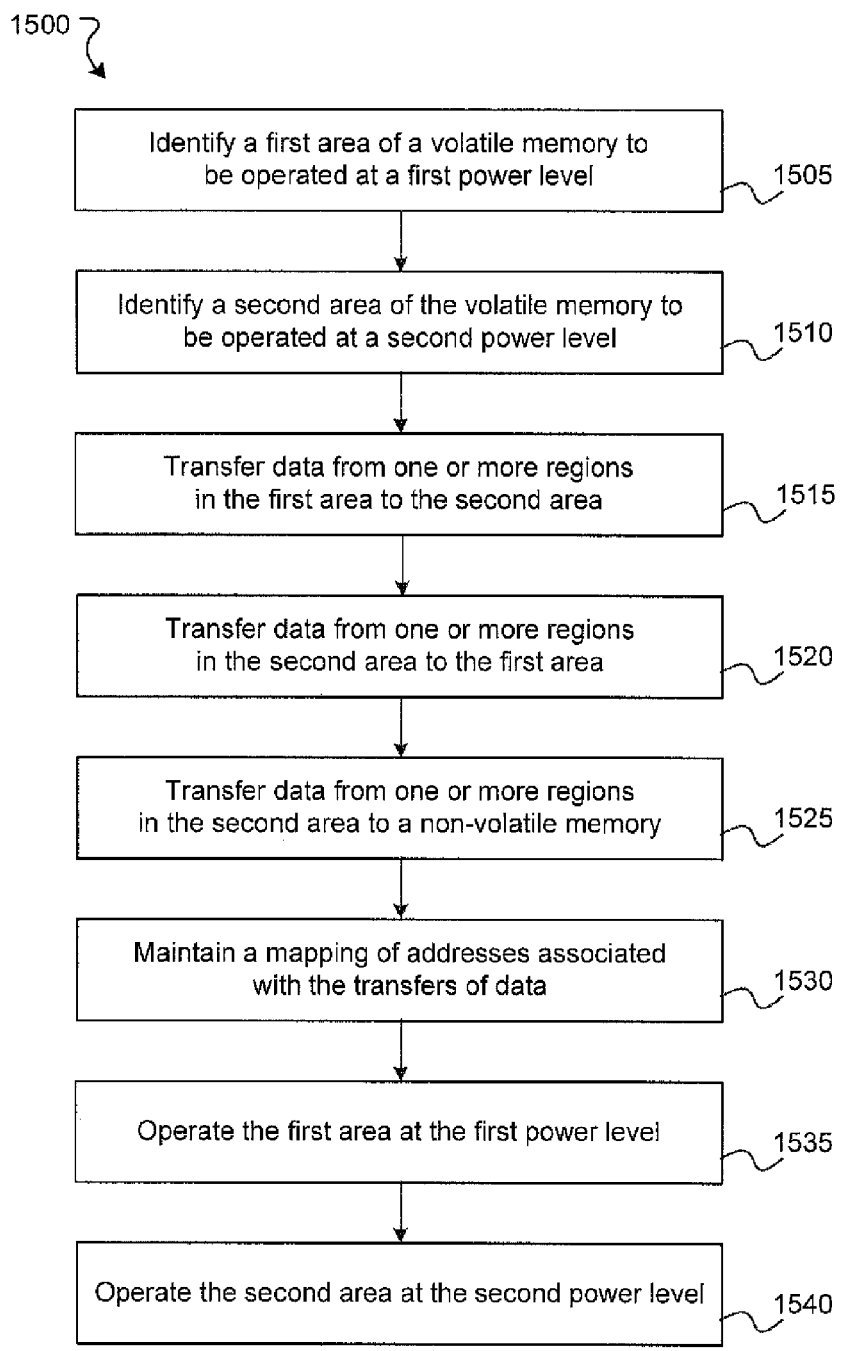
FIG. 15 illustrates a flowchart of examples of operations performed by a memory controller to manage data and power in a memory.

FIG. 15 illustrates a flowchart of examples of operations 1500 performed by a memory controller to manage data and power in a volatile memory. The memory controller identifies a first area of a volatile memory that is to be operated at a first power level at 1505. The memory controller identifies a second area of the volatile memory that is to be operated at a second power level at 1510, where the first power level is higher than the second power level. In standby mode, for example, the first area may be a self-refresh area, and the first power level may be reduced power level. The second area may be an off area, and the second power level may be no power. In active mode, for example, the first area may be an active area, and the first power level may be an active power level. The second area may be either a self-refresh area or an off area, and the second power level may be either reduced power or no power, respectively. The first area and the second area may be identified based on the number of frequently accessed regions of the memory.

At 1515, the memory controller may transfer data stored in one or more regions in the first area to the second area. The data that is transferred may include data stored in regions that are rarely accessed. For example, the memory controller may transfer the data from an active area to a self-refresh area. The memory controller may transfer the data from an active area to an area that is to be turned off. The memory controller may transfer the data from a self-refresh area to an area that is to be turned off.

At 1520, the memory controller may transfer data stored in one or more regions in the second area to the first area. The data that is transferred may include data stored in regions that are frequently accessed. For example, the memory controller may transfer the data from a self-refresh area to an active area. The memory controller may transfer data from an area that is to be turned off to an active area. The memory controller may transfer data from an area that is turned off to a self-refresh area.

At 1525, the memory controller may transfer data stored in one or more regions in the second area to a non-volatile memory. For example, when the second area is to be turned off, the memory controller may transfer the data stored in the second area to a non-volatile memory.

After transferring data, the memory controller may maintain a mapping of an address of the memory from which the data was transferred to an address of the memory or the non-volatile memory in which the data is stored at 1530. The memory controller operates the first area at the first power level at 1535, and the memory controller operates the second area at the second power level at 1540.

Figure 16:
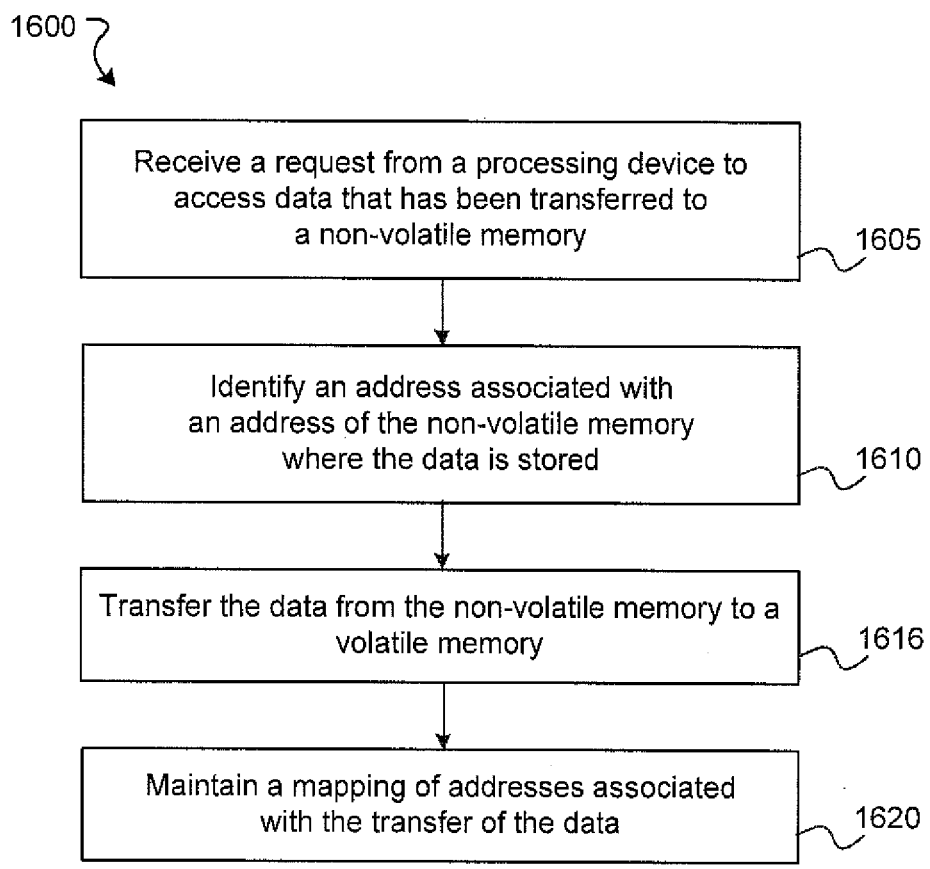
FIG. 16 illustrates a flowchart of examples of operations performed by a volatile memory controller in response to requests received from a processing device to access data that has been transferred from a volatile memory to a non-volatile memory.

FIG. 16 illustrates a flowchart of examples of operations 1600 performed by a memory controller in response to requests received from a processing device to access data that has been transferred to a non-volatile memory. At 1605, the memory controller receives a request from a processing device to access data that has been transferred from a volatile memory to a non-volatile memory. The memory controller identifies an address associated with an address of the non-volatile memory where the data is stored at 1610. The memory controller may identify the address based on a mapping of an address of the volatile memory from which the data was transferred to an address of the non-volatile memory in which the data is stored.

At 1615, the memory controller transfers the data from the non-volatile memory to a volatile memory. In some implementations, the memory controller may transfer the data to an active area of the volatile memory. In some implementations, the memory controller may restore power to an area that was turned off and transfer the data to that area of the volatile memory. After the transfer of the data, the memory controller may maintain a mapping of an address of the volatile memory which stored the data before it was transferred to the non-volatile memory to an address of the volatile memory which stores the data after the transfer from the non-volatile memory at 1620.

A few implementations have been described in detail above, and various modifications are possible. The disclosed subject matter, including the functional operations described in this specification, can be implemented in electronic circuitry, computer hardware, firmware, or in combinations of them, such as the structural means disclosed in this specification and structural equivalents thereof, including system on chip (SoC) implementations.

While this disclosure contains many specifics, these should not be construed as limitations on the scope of what may be claimed, but rather as descriptions of features that may be specific to particular implementations. It will be understood that various modifications may be made without departing from the spirit and scope of the invention. For example, the steps of the methods described above can be performed in a different order and still achieve desirable results. Accordingly, other implementations are within the scope of the following claims.

What is claimed is:

1. A method, comprising:
    identifying a first area of a memory to be operated at a first power level;
    identifying a second area of the memory to be operated at a second power level, the first power level being higher than the second power level;
    transferring data in a region in the second area to a region in the first area, the region in the second area being a region that is frequently accessed by a processing device;
    maintaining a mapping of an address associated with the region in the second area to an address associated with the region in the first area;
    operating the first area at the first power level; and
    operating the second area at the second power level.

2. The method of claim 1, further comprising:
    receiving a request for data in a second region in the second area; and
    operating the second region at the first power level.

3. The method of claim 1, wherein the memory is a volatile memory, the method further comprising:
    transferring data in a second region in the second area to a non-volatile memory; and
    maintaining a mapping of an address associated with the second region in the second area to an address associated with the non-volatile memory.

4. The method of claim 3, further comprising:
    receiving a request for the data transferred from the second region in the second area to the non-volatile memory;
    identifying the address associated with the non-volatile memory based on the mapping of the address associated with the second region in the second area to the address associated with the non-volatile memory;
    transferring the data from the non-volatile memory to a second region in the first area; and
    maintaining a mapping of the address associated with the second region in the second area to an address associated with the second region in the first area.

5. The method of claim 3, further comprising:
    receiving a request for the data transferred from the second region in the second area to the non-volatile storage device;
    identifying the address associated with the non-volatile memory based on the mapping of the address associated with the second region in the second area to the address associated with the non-volatile memory;
    operating the second region at the first power level;
    transferring the data from the non-volatile memory to the second region in the second area; and
    removing the mapping of the address associated with the second region in the second area to the address associated with the non-volatile memory.

6. The method of claim 1, wherein the memory is a volatile memory, the method further comprising:
    transferring data in a second region in the first area to a non-volatile memory, the second region in the first area being a region that is rarely accessed by a processing device; and
    maintaining a mapping of an address associated with the second region in the first area to an address associated with the non-volatile memory.

7. The method of claim 1, further comprising:
    receiving a request for data in the first area; and
    operating the first area at a third power level, the third power level being higher than the first power level and the second power level.

8. The method of claim 1, further comprising:
    receiving a request for data in the second area; and
    operating the second area at the first power level.

9. An apparatus, comprising:
    memory distribution management circuitry coupled with a memory, the memory distribution management circuitry configured to:
        identify a first area of the memory to be operated at a first power level,
        identify a second area of the memory to be operated at a second power level, the first power level being higher than the second power level, and
        transfer data in a region in the second area to a region in the first area, the region in the second area being a region that is frequently accessed by a processing device;
    a translation structure coupled with the memory distribution management circuitry, the translation structure configured to store a mapping of an address associated with the region in the second area to an address associated with the region in the first area; and
    a power management circuitry coupled with the memory distribution management circuitry and the memory, the power management circuitry configured to:
        operate the first area at the first power level, and
        operate the second area at the second power level.

10. The apparatus of claim 9, wherein
    the memory distribution management circuitry is further configured to receive a request for data in a second region in the second area; and
    the power management circuitry is further configured to operate the second region at the first power level responsive to the request.

11. The apparatus of claim 9, wherein
    the memory is a volatile memory;
    the memory distribution management circuitry is further configured to transfer data in a second region in the second area to a non-volatile memory; and
    the translation structure is further configured to store a mapping of an address associated with the second region in the second area to an address associated with the non-volatile memory.

12. The apparatus of claim 11, wherein
    the memory distribution management circuitry is further configured to:
        receive a request for the data transferred from the second region in the second area to the non-volatile memory,
        identify the address associated with the non-volatile memory based on the mapping of the address associated with the second region in the second area to the address associated with the non-volatile memory, and transfer the data from the non-volatile memory to a second region in the first area; and the translation structure is further configured to store a mapping of the address associated with the second region in the second area to an address associated with the second region in the first area.

13. The apparatus of claim 11, wherein
the memory distribution management circuitry is further configured to:
receive a request for the data transferred from the second region in the second area to the non-volatile memory,
identify the address associated with the non-volatile memory based on the mapping of the address associated with the second region in the second area to the address associated with the non-volatile memory, and
transfer the data from the non-volatile memory to the second region in the second area;
the power management circuitry is further configured to operate the second region at the first power level responsive to the request; and
the translation structure is further configured to remove the mapping of the address associated with the second region in the second area to the address associated with the non-volatile memory.

14. The apparatus of claim 9, wherein
the memory is a volatile memory;
the memory distribution management circuitry is further configured to transfer data in a second region in the first area to a non-volatile memory, the second region in the first area being a region that is rarely accessed by a processing device; and
the translation structure is further configured to store a mapping of an address associated with the second region in the first area to an address associated with the non-volatile memory.

15. The apparatus of claim 9, wherein
the memory distribution management circuitry is further configured to receive a request for data in the first area; and
the power management circuitry is further configured to operate the first area at a third power level responsive to the request, the third power level being higher than the first power level and the second power level.

16. The apparatus of claim 9, wherein
the memory distribution management circuitry is further configured to receive a request for data in the second area; and
the power management circuitry is further configured to operate the second area at the first power level responsive to the request.

17. A system, comprising:
a processing device;
a memory; and
a memory controller configured to:
identify a first area of the memory to be operated at a first power level,
identify a second area of the memory to be operated at a second power level, the first power level being higher than the second power level,
transfer data in a region in the second area to a region in the first area, the region in the second area being a region that is frequently accessed by the processing device;
maintain a mapping of an address associated with the region in the second area to an address associated with the region in the first area,
operate the first area at the first power level, and
operate the second area at the second power level.

18. The system of claim 17, wherein the memory controller is further configured to:
receive a request for data in a second region in the second area; and
operate the second area at the first power level.

19. The system of claim 17, wherein the memory is a volatile memory and the memory controller is further configured to:
transfer data in a second region in the second area to a non-volatile memory; and
maintain a mapping of an address associated with the second region in the second area to an address associated with the non-volatile memory.

20. The system of claim 19, wherein the memory controller is further configured to:
receive a request for the data transferred from the second region in the second area to the non-volatile memory;
identify the address associated with the non-volatile memory based on the mapping of the address associated with the second region in the second area to the address associated with the non-volatile memory;
transfer the data from the non-volatile memory to a second region in the first area; and
maintain a mapping of the address associated with the second region in the second area to an address associated with the second region in the first area.

21. The system of claim 19, wherein the memory controller is further configured to:
receive a request for the data transferred from the second region in the second area to the non-volatile memory;
identify the address associated with the non-volatile memory based on the mapping of the address associated with the second region in the second area to the address associated with the non-volatile memory;
operate the second region at the first power level;
transfer the data from the non-volatile memory to the second region in the second area; and
remove the mapping of the address associated with the second region in the second area to the address associated with the non-volatile memory.

22. The system of claim 17, wherein the memory is a volatile memory and the memory controller is further configured to:
transfer data in a second region in the first area to a non-volatile memory, the second region in the first area being a region that is rarely accessed by a processing device; and
maintain a mapping of an address associated with the second region in the first area to an address associated with the non-volatile memory.

23. The system of claim 17, wherein the memory controller is further configured to:
receive a request for data in the first area; and
operate the first area at a third power level, the third power level being higher than the first power level and the second power level.

24. The system of claim 17, wherein the memory controller is further configured to:
receive a request for data in the second area; and
operate the second area at the first power level.

* * * * *